United States Patent [19]

Koufopavlou et al.

[11] Patent Number: 5,493,652
[45] Date of Patent: Feb. 20, 1996

[54] MANAGEMENT SYSTEM FOR A BUFFER MEMORY HAVING BUFFERS OF UNIFORM SIZE IN WHICH THE BUFFERS ARE DIVIDED INTO A PORTION OF CONTIGUOUS UNUSED BUFFERS AND A PORTION OF CONTIGUOUS BUFFERS IN WHICH AT LEAST SOME ARE USED

[75] Inventors: Odysseas Koufopavlou, Patras, Greece; Ahmed Nasr-El-Din Tantawy, Yorktown Heights, N.Y.

[73] Assignee: International Business Machines Corporation, Armonk, N.Y.

[21] Appl. No.: 235,767

[22] Filed: Apr. 29, 1994

[51] Int. Cl.⁶ .................................................. G06F 12/02
[52] U.S. Cl. ................... 395/497.01; 395/600; 395/250
[58] Field of Search ................................. 395/250, 275, 395/425, 600

[56] References Cited

U.S. PATENT DOCUMENTS

| | | | |
|---|---|---|---|
| 4,758,944 | 7/1988 | Bartley et al. | 395/425 |
| 4,912,629 | 3/1990 | Schuler, Jr. | 395/600 |
| 5,025,367 | 6/1991 | Gurd et al. | 395/600 |
| 5,109,336 | 4/1992 | Guenther et al. | 395/425 |
| 5,247,634 | 9/1993 | Cline et al. | 395/425 |
| 5,339,411 | 8/1994 | Heaton, Jr. | 395/600 |

*Primary Examiner*—Parshuiam S. Lall
*Assistant Examiner*—Viet Vu
*Attorney, Agent, or Firm*—Douglas W. Cameron; Ronald L. Drumheller

[57] ABSTRACT

A memory management system for maximizing the number of contiguous free buffers to reduce the required number of free buffer pointers. Accordingly, with this invention a buffer memory is divided into two disjoint areas with one area having only contiguous free buffers while the other area has a combination of free and used buffers. This invention also has a means for maximizing the number of contiguous free buffers by using the buffers in the area having only contiguous free buffers only if there are no free buffers in the other area having both used and free buffers.

12 Claims, 7 Drawing Sheets

BUFFER ALLOCATION

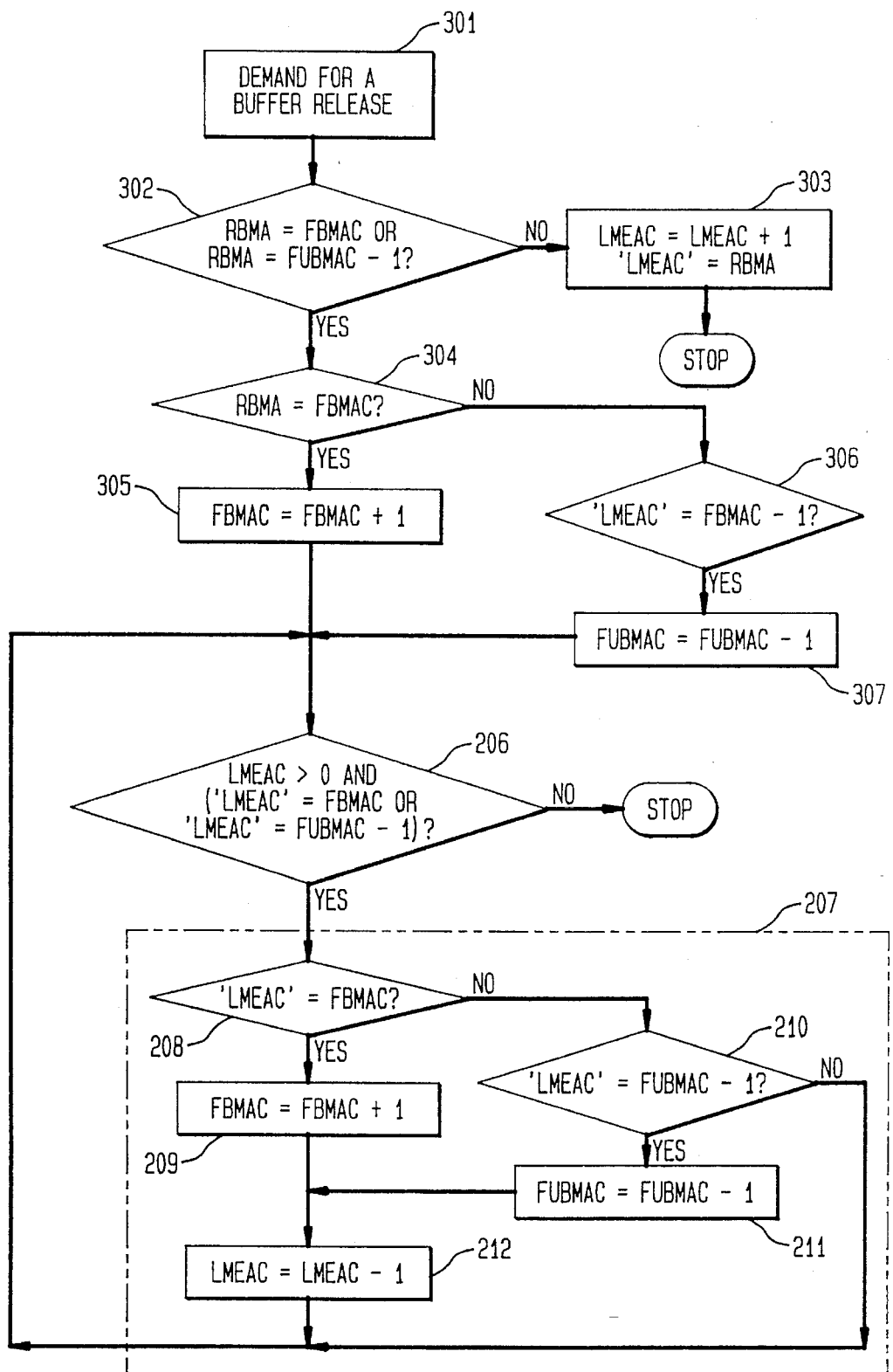

FIG. 4A

```
IF (A NEW BUFFER IS REQUIRED)
  THEN
    IF (LMEAC > 0)                              [THERE ARE ENTRIES IN THE POINTER MEMORY]
    |- THEN
    |    NBMA = 'LMEAC'                         [THE NEW BUFFER MEMORY ADDRESS IS THE CONTENT
    |  SYN1                                      OF THE POINTER MEMORY IN THE LAST MEMORY
    |                                            ENTRY ADDRESS COUNTER]
    |-   LMEAC = (LMEAC -1)                     [REMOVE THE LAST ENTRY FROM THE POINTER MEMORY]
    |-   WHILE ((LMEAC > 0) AND ((LMEAC = FBMAC) OR (LMEAC = (FUBMAC - 1))))
    |                                           [THERE ARE ENTRIES IN THE POINTER MEMORY AND
    |                                            THE VALUE OF THE LAST ENTRY IN THE POINTER
    |                                            MEMORY IS EQUAL TO THE FIRST USED BUFFER MEMORY
    |                                            ADDRESS COUNTER OR IS EQUAL TO THE FIRST UNUSED
    |                                            BUFFER MEMORY ADDRESS COUNTER MINUS ONE]
    |  SYN2
    |-     IF (LMEAC = FBMAC)
    |        FBMAC = (FBMAC + 1)                [INCREASE BY ONE THE FIRST USED BUFFER
    |                                            MEMORY ADDRESS COUNTER]
    |-     IF [LMEAC = (FUBMAC -1)]
    |        FUBMAC = (FUBMAC - 1)              [DECREASE BY ONE THE FIRST UNUSED BUFFER
    |                                            MEMORY ADDRESS COUNTER]
    |-     LMEAC = (LMEAC -1)                   [REMOVE THE LAST ENTRY FROM THE POINTER MEMORY]
    |- ELSE                                     [THERE ARE NO ENTRIES IN THE POINTER MEMORY]
    |    NBMA = FUBMAC                          [THE NEW BUFFER MEMORY ADDRESS IS THE FIRST
    |                                            UNUSED BUFFER MEMORY ADDRESS COUNTER]
    |  SYN3
    |-   FUBMAC = (FUBMAC + 1)                  [INCREASE BY ONE THE FIRST UNUSED BUFFER
                                                 MEMORY ADDRESS COUNTER]
```

```
IF (A NEW BUFFER IS RELEASED)
  THEN
    |- IF ((RBMA = FBMAC) OR (RBMA = (FUBMAC -1)))
SYN6            {THE RELEASE BUFFER MEMORY ADDRESS IS EQUAL TO
    |-           THE FIRST USED BUFFER MEMORY ADDRESS COUNTER OR IS
                 EQUAL TO THE FIRST UNUSED BUFFER MEMORY ADDRESS
                 COUNTER MINUS ONE}

|- THEN
    |- IF (RBMA = FBMAC)
SYN4    FBMAC = (FBMAC + 1)          {INCREASE BY ONE THE FIRST USED BUFFER MEMORY
                                      ADDRESS COUNTER}

|- IF [(RBMA = FUBMAC -1)]
    |-    FUBMAC = (FUBMAC - 1)      {REDUCE THE FIRST UNUSED BUFFER MEMORY ADDRESS
                                      COUNTER BY ONE}

|- WHILE ((LMEAC > 0) AND ((LMEAC = FBMAC) OR (LMEAC = (FUBMAC - 1)))
    |                                {THERE ARE ENTRIES IN THE POINTER MEMORY AND
    |                                 THE VALUE OF THE LAST ENTRY IN THE POINTER
    |                                 MEMORY IS EQUAL TO THE FIRST USED BUFFER MEMORY
    |                                 ADDRESS COUNTER OR IS EQUAL TO THE FIRST UNUSED
SYN2                                  BUFFER MEMORY ADDRESS COUNTER MINUS ONE}

|- IF (LMEAC = FBMAC)
    |     FBMAC = (FBMAC + 1)        {INCREASE BY ONE THE FIRST USED MEMORY ADDRESS CO}
    |  IF [LMEAC = (FUBMAC - 1)]
    |     FUBMAC = (FUBMAC - 1)      {DECREASE BY ONE THE FIRST UNUSED BUFFER MEMORY ADDRESS}
    |     LMEAC = )LMEAC - 1)        {REMOVE THE LAST ENTRY FROM THE POINTER MEMORY}

|- ELSE
SYN5 LMEAC = (LMEAC + 1)             {INCREASE THE LAST MEMORY ENTRY ADDRESS COUNTER}
    |- 'LMEAC' = RBMA                {ADD AN ENTRY TO THE POINTER MEMORY}
```

FIG. 4B

MANAGEMENT SYSTEM FOR A BUFFER MEMORY HAVING BUFFERS OF UNIFORM SIZE IN WHICH THE BUFFERS ARE DIVIDED INTO A PORTION OF CONTIGUOUS UNUSED BUFFERS AND A PORTION OF CONTIGUOUS BUFFERS IN WHICH AT LEAST SOME ARE USED

TECHNICAL FIELD

This invention relates to a method and apparatus for efficiently storing data in buffer memory.

DESCRIPTION OF THE PRIOR ART

Recent advances in transmission communication media (i.e. optical) shift the bottleneck in communication systems from the transmission speed to the processing speed of the communication subsystems. The existing general purpose computer systems do not have tile required processing power to handle tile amount of traffic which the recent high speed transmission media can provide. For this reason it is necessary to build dedicated communication subsystems which implement the lower layers of the communication protocol stack (i.e. OSI, TCP/IP). One of the most important issues in all these implementations is the buffer management. An efficient implementation results in low cost and high performance.

In most cases the data that will be processed are stored in a memory. These data can be data packets, control packets or data entries (i.e. timer entries, etc.). An efficient way to store all these types of data is by dividing the memory into units (buffers). The size of each buffer does not exceed the maximum size of the packets or entries (data units). Every time that a next; data unit has to be stored in the memory, the buffer manager gets an empty buffer. It allocates the buffer and stores the data unit. When the content of one buffer is not needed, the buffer manager marks this buffer as empty.

The buffer manager keeps track of all the empty buffers. Every time a new buffer is required, the buffer manager provides one and when a buffer is not used any more, the buffer manager returns it to the pool of empty buffers.

There are different schemes for the management of empty buffers. The choice of the best suitable scheme for a design depends on the required number, size and type of buffers required for that specific application.

In one scheme for the management of empty buffers, the empty buffers form a linked list and the memory manager keeps two pointers, which are the addresses of the first and the last empty buffers. The first free buffer address is the head pointer, while the last free buffer address is the tail pointer. Every time an empty buffer is needed, the memory manager allocates the first empty buffer in the linked list and stores the address of the second empty buffer in the head pointer memory. When the contents in a buffer are not needed any more, the memory manager links this latter buffer to the end of the empty buffer list, and the tail pointer becomes the address of this latter buffer. This scheme has two major disadvantages: limited buffer management speed and memory bus contention. Usually the buffer memory is large and relatively slow for cost reasons, thereby restricting buffer management speed. Use of the same memory bus for both data and pointer operations results in high memory bus contention.

The buffer management speed can be increased by using a separate faster memory to store the pointers of the linked list of empty buffers. This separate memory must be accessed each time a new buffer is required or released. The required size of this separate pointer memory is equal to the number of buffers in the buffer memory.

By organizing the memory of the empty buffer addresses as a Last Input First Output (LIFO), the second pointer can be avoided, and each entry will contain the address of one empty buffer. This latter scheme is suitable in designs where the number of memory buffers is small so as to allow the empty buffer pointer memory to be on one chip with the other memory management logic. However, for designs where a large number of memory buffers is needed, this scheme is difficult to implement because of the limitation of the memory size in an Application Specific Integrated Circuit (ASIC design).

There is, therefore, a need for a buffer management design capable of being implemented on a single chip and capable of handling a large number of buffers in the order of 10³ entries.

U.S. Pat. No. 4,334,287 to Wiedenman et al teaches the notion of a separate data and pointer memory, where specific memory locations are dedicated to specific peripheral units. No reference is given to the way the data buffer memory is allocated.

U.S. Pat. No. 5,146,588 to Crater et al also teaches the notion of a separate data and pointer memory, where the pointer memory is used for indicating byte positions to avoid unnecessary memory reset operations.

U.S. Pat. No. 5,193,207 describes a method of sorting and storing data in memory, where the data elements are stored sequentially as they arrive. The data elements are then sorted and assembled in link lists each of which corresponds to a sort parameter. Two other smaller memories are also used. One is used to store the sort parameters along with pointers to the first and last elements in a linked list corresponding to a particular sort parameter. The other smaller memory is used to store the pointers forming the double linked list. Once all data is stored, it can then be retrieved using the two pointer memories. No method of optimizing buffer space allocation is used.

U.S. Pat. No. 4,419,746 to Hunter et al discloses a memory system which has a separate pointer memory and is capable of permitting multiple memory operations in a single instruction cycle. Hunter teaches the use of address pointer registers where each address pointer register stores an address signal capable of addressing two locations in memory in response to a select signal. This patent, however, does not deal with the manner in which memory locations are allocated.

U.S. Pat. No. 5,020,117 to Ooi et al discloses a character recognition system where addresses are read out from the address pointer memory in ascending or descending order.

Japanese Patent 55 088 118 describes a memory system where a central controller sequentially reads entries stored in a buffer memory with two pointers, one to each end of the area where data elements are stored. When the two pointers point to the same location, the buffer is declared empty, and the central controller is informed. No non-sequential data access is done.

SUMMARY OF THE INVENTION

It is an object of this invention to provide efficient management of a memory buffer to decrease required memory space.

It is a more specific object of this invention to integrate a pointer memory for the management of a large number of buffers on a single VLSI chip.

It is a still more specific object of this invention to maximize the number of contiguous empty buffers in a buffer memory.

It is another more specific object of this invention to reduce the number of required pointers for empty buffers.

Accordingly, this invention is a memory management system having a buffer memory which has a plurality of buffers, a means for dividing the buffer memory into two disjoint memory areas with one of the memory areas having only contiguous free buffers while the other area has both free and used buffers, and finally, a means for maximizing the number of contiguous free buffers in the area having only free buffers.

By maximizing the number of contiguous free buffers, the number of free buffer pointers is reduced; and consequently, the need for memory space is reduced, thereby allowing the integration on a single VLSI chip of a pointer memory used to manage a large number of memory buffers.

To maximize the number of contiguous free buffers, this invention uses two counters to identify the borders or limits of the free buffer area while using a pointer memory to identify free buffers in the area of the buffer memory which has both used and unused buffers.

BRIEF DESCRIPTION OF THE DRAWINGS

FIG. 3 is a flow diagram illustrating the algorithm for releasing a buffer for subsequent use.

FIGS. 4a and 4b is the pseudo code implementing the invention.

DESCRIPTION OF THE PREFERRED EMBODIMENT

Figure 1:
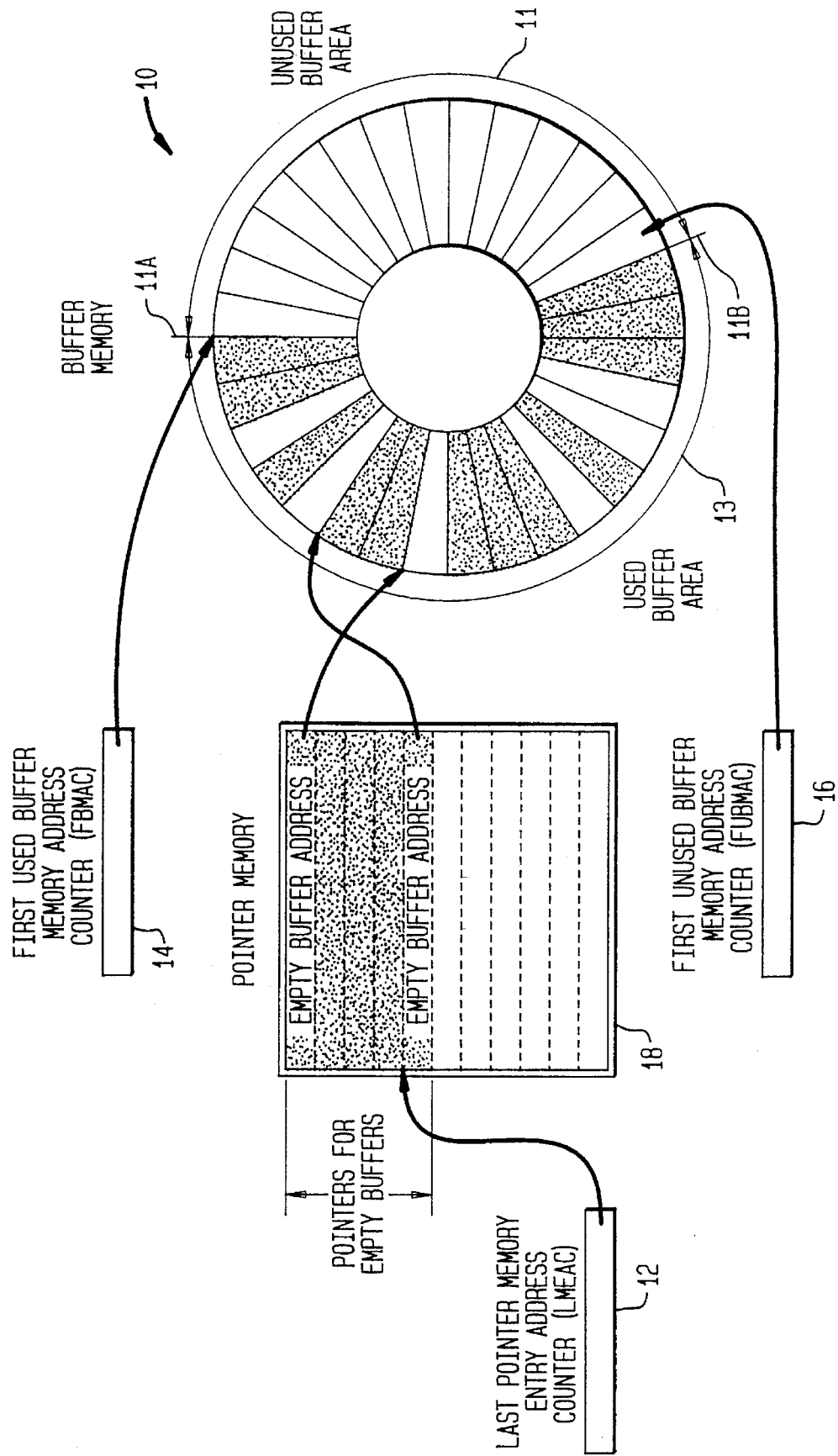
FIG. 1 graphically illustrates the memory management system implementing the current invention.

Shown in FIG. 1 is the apparatus and memory architecture used to implement the invention. Shown is buffer memory 10 which is divided into an unused buffer area 11 having only contiguous free buffers and a used buffer area 13. The unused buffer area extends from point 11A of the buffer memory clockwise to point 11B, while the area extending counterclockwise from 11A to 11B is the used buffer area. Pointer memory 18 is used to store empty buffer addresses which identify free buffers in the used buffer area 13. Also shown are three counters: the last pointer memory entry address counter 12, the first used buffer memory address counter 14 and the first unused buffer memory address counter 16. Counter 12 is used to point to the last entry in the pointer memory while counters 14, and 16 define the boundaries between the used and unused buffer areas as explained below.

The invention consists of two primary parts. The first is for buffer allocation and the second is for buffer release.

Acronyms Used

LMEAC=Content of Last Memory Entry Address Counter

'LMEAC'=Content of the Pointer Memory in the LMEAC

RBMA=Content of Release Buffer Memory Address

FBMAC=Content of First Used Buffer Memory Address Counter

FUBMAC=Content of First Unused Buffer Memory Address Counter

NBMA=Content of New Buffer Memory Address

The above acronyms refer to either the content of the respective counters or the contents themselves.

Figure 2:
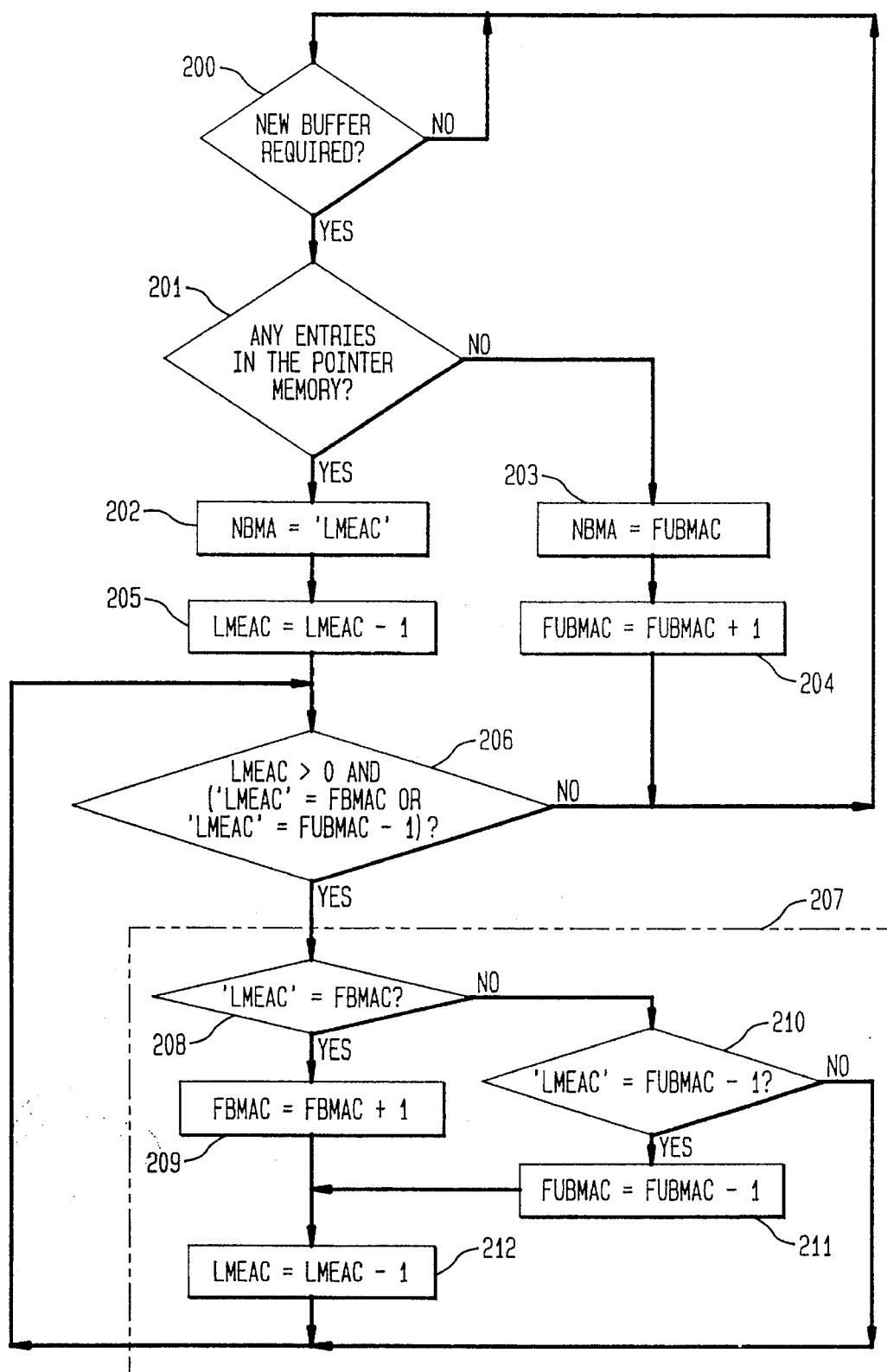
FIG. 2 is a flow diagram illustrating the algorithm for allocating a buffer when one is required.
Figure 5:
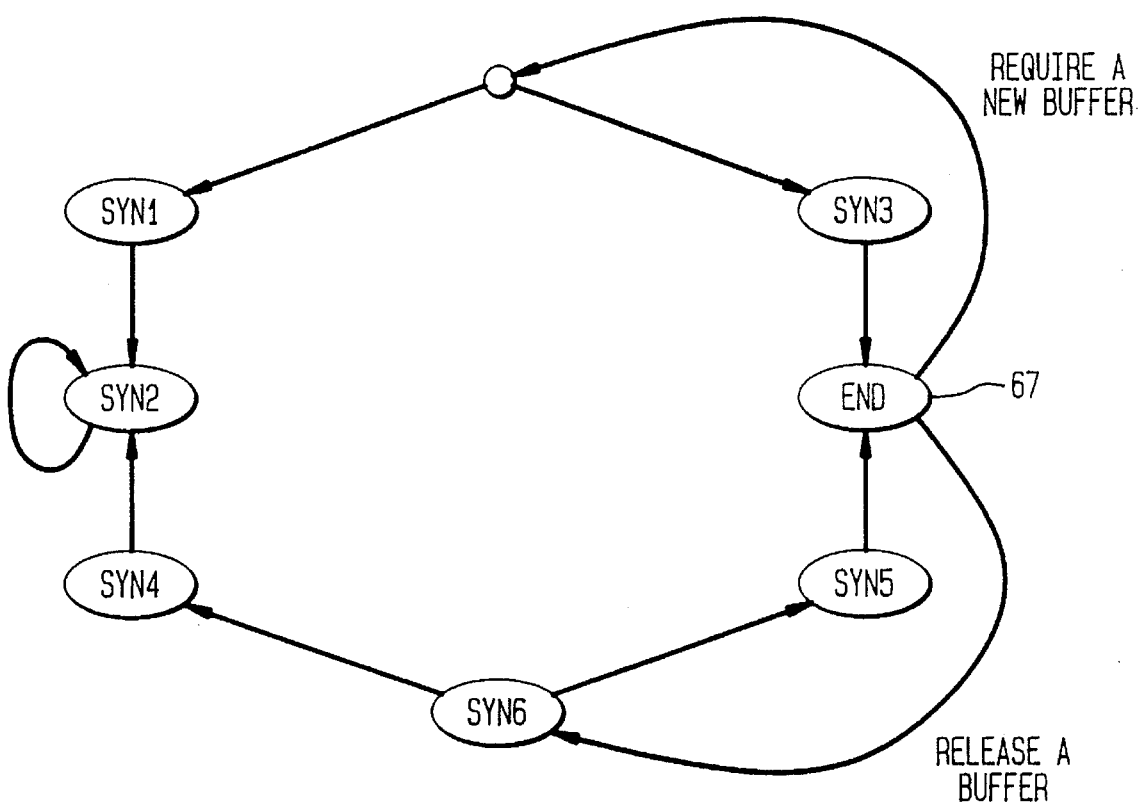
FIG. 5 graphically illustrates a state diagram for implementing the current invention.

Shown in FIGS. 4a and 4b is the pseudo code for the implementation of the scheme illustrated in FIGS. 2, 3, and the state machine of FIG. 5. The correspondence between the states Syn 1 through Syn 6 of FIG. 5 and the blocks of the flow charts of FIGS. 2 and 3 are as follows.

Syn No. 1 Block 202, 205

Syn No. 2 Block 206, 207

Syn No. 3 Block 203, 204

Syn No. 4 Block 304, 305, 306, 307

Syn No. 5 Block 303

Syn No. 6 Block 302

Buffer Allocation

Referring to FIG. 2, when a new buffer is required (200), a check (201) is done to see if there are entries in the Pointer Memory. If yes, the New Buffer Memory Address (NBMA) becomes the content of the Pointer Memory in the Last Memory Entry Address Counter (LMEAC.) (202), i.e., the last entry in the pointer memory. If no, the New Buffer Memory Address (NBMA) is set equal the value of the First Unused Buffer Memory Address Counter (FUBMAC) (203), and First Unused Buffer Memory Address Counter is increased by one (204). After the last entry is removed from the Pointer Memory (205), a check is done to see if the new last entry in the Pointer Memory has a value equal to the First Used Buffer Memory Address Counter (FBMAC) (206), or is equal to the First Unused Buffer Memory Address Counter minus one (206). If yes, this entry is removed as shown at 207.

The details of the procedure for the removal of an entry is described at 207. If the content of the pointer memory location addressed by the LMEAC is equal to FBMAC 14 (208), FBMAC is increased by one (209). If the content of the pointer memory location addressed by LMEAC is not equal to FBMAC, then the content of the pointer memory location address by LMEAC is compared to the value of FUBMAC minus one (210). If the latter two values are equal, the value of FUBMAC is decreased by one (211). After steps 209 and 211, LMEAC is decreased by one (212).

Buffer Release

Referring to FIG. 3, in order to release a buffer (301), a check is done to see if the Release Buffer Memory Address (RBMA) is equal to the First Used Buffer Memory Address Counter (FBMAC) or is equal to the First Unused Buffer Memory Address Counter (FUBMAC) minus one (302). If not, Release Buffer Memory Address is stored as the last entry in the Pointer Memory (303). Otherwise, if the RBMA is equal to the FBMAC (304), then the FBMAC is increased by one (305). If, however, the RBMA is equal to FUBMAC minus one (306), the value of FUBMAC is decreased by one (307). The remaining steps shown in FIG. 3 describe the process for transferring a buffer from the used buffer area 13 to the unused buffer area 11, thereby dynamically dividing the buffer memory 10. The above procedure is described in steps 206 through 212 of FIG. 2.

FIGS. 4a and 4b is the Pseudo code describing the above procedure for the buffer allocation and release as described in FIGS. 2 and 3.

Figure 6:
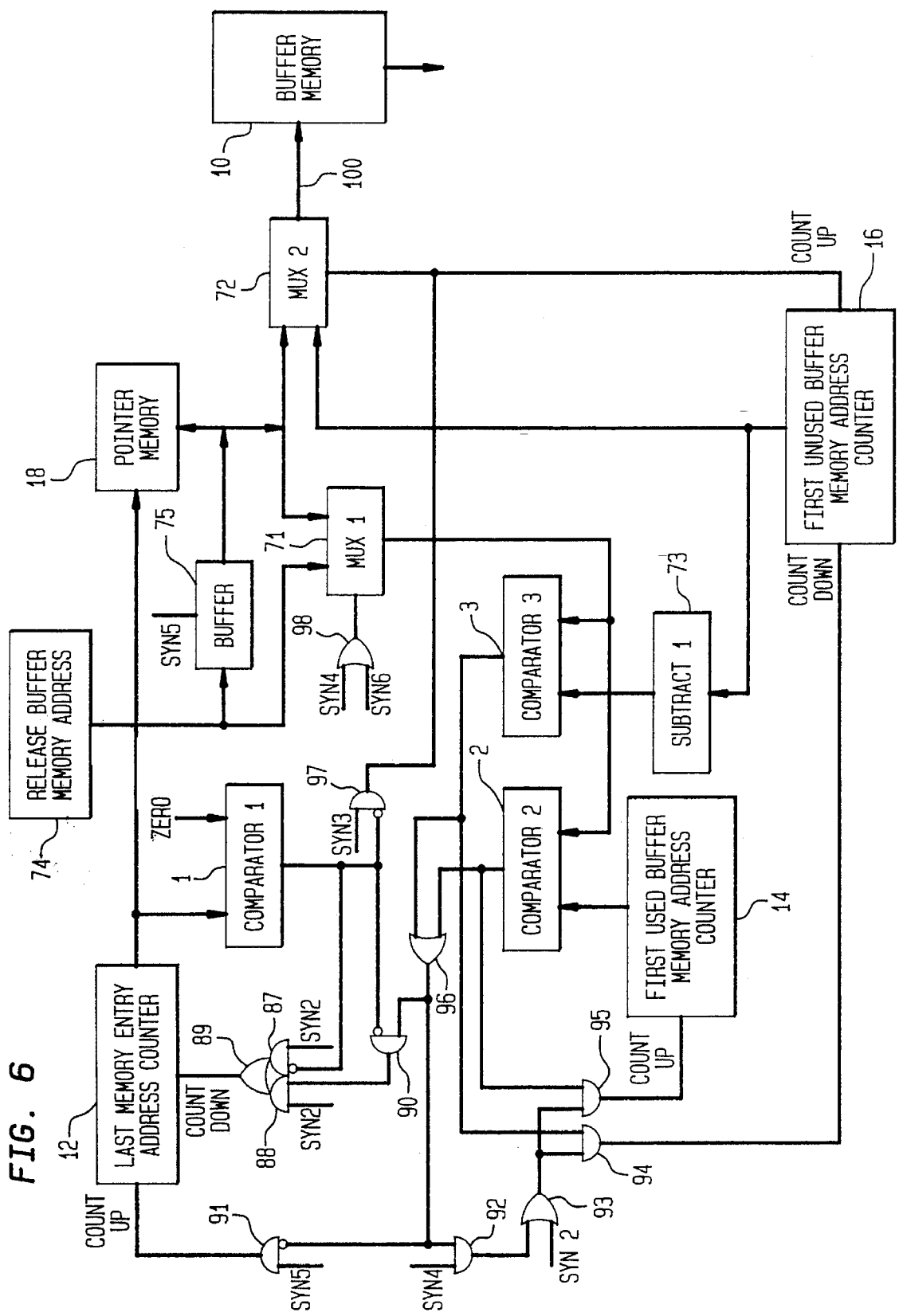
FIG. 6 is a hardware implementation of the current invention using the state machine of FIG. 5 and the flow diagram of FIG. 3.

The above schemes described in FIGS. 2 and 3 can be implemented as a Finite State Machine (FSM) as shown in FIG. 5. In FIG. 5 the different states of the FSM are the parts of the algorithm indicated by syn1, syn2, . . . , syn6. The action starts in two cases, when a new buffer is required or when a full buffer is released. In these two cases the end of the action is the end state (67). In a hardware implementation these are different timing phases in which the design operates. A generic architecture to implement this algorithm in hardware is shown in FIG. 6. The only design blocks that are needed (except the memories) are 3 up/down counters 12, 14, and 16, 3 comparators 1, 2, 3 which check for equality, 2 multiplexers 71, 72, 1 subtractor 73 73, 1 register 74, 1 tri state buffer 75 and some logic AND gates 87, 88, 90–92, 94, 95, 97, and OR gates 89, 93, 96, 98. To complete the design, another circuit is needed which generates the synchronization signals syn1, syn2, syn6. These signals set active the different parts of the design.

The operation of the timing state machine of FIG. 5 which changes states as a function of time is described in the description of FIGS. 2 and 3 above by following the block numbers and the corresponding Syn numbers which appear in the same row of the above table.

FIG. 6 is a hardware implementation of the procedures described and illustrated in FIGS. 2 and 3. When a new buffer is required, the signals Syn 1 and Syn 3 are activated. Comparator 1 implements step 201 of FIG. 2. MUX 2 (72) selects either the output of pointer memory 18 or counter 16 to address the buffer memory 100 based on the output of gate 97. See blocks 203 and 202. The output of logic gate 97 is also used to increment counter 16 as per block 204. The output of comparator 1 is also used to decrement counter 12 in accordance with block 205 by passing through logic gates 87 and 89, When Syn 2 is enabled, gates 90 and 96 implement block 206, comparator 2 implements block 208, block 210 is implemented by comparator 3 and subtractor 73, and logic gates 92–95 implement blocks 211 and 209. Logic gates 88 and 89, along with Syn 2 enabled, are used to implement block 212.

When a buffer is released, Syn 6 is enable, thereby selecting RBMA (74) through MUX 1 (71). The Syn 4 and Syn 5 are enabled causing the following operations: block 302 is implemented by gate 96, logic gate 91 is used to increment counter 12 in accordance with block 303, and comparator 3 and logic gates 92–94 and 96 are used to decrement counter 16 in accordance with blocks 306–7.

Having thus described our invention, what we claim as new and desire to secure by Letters Patents is:

1. A management system for a buffer memory containing a multiplicity of buffers all of identical size and each having a unique buffer address, comprising:

means for defining a border between an unused buffer memory portion of said buffer memory which contains only buffers that are contiguous in address and unused and a used buffer memory portion of said buffer memory which contains at least one buffer that is used and possibly contains also one or more buffers that are unused;

a pointer memory for holding a list of currently unused buffers in said used buffer memory portion;

means for selecting a next buffer for use from said list of unused buffers, and if there is no unused buffer in said list, for selecting as said next buffer for use a buffer from said unused buffer memory portion that is immediately adjacent in address to said used buffer memory portion and increasing said used buffer memory portion by one so as to include said next buffer for use in said used buffer memory portion;

means for returning a used buffer to unused status by adding said returning buffer to said list of unused buffers; and means for checking each time a returning buffer is added to said list of unused buffers, whether said added buffer is immediately adjacent to said border between said used and unused buffer memory portions, and if so increasing said unused buffer memory portion by one so as to include said returning buffer in said unused buffer portion and removing said returning buffer from said list of unused buffers.

2. A management system for a buffer memory as defined in claim 1, wherein said means for defining a border includes means for storing the buffer address of a buffer in the used buffer memory portion that is adjacent to said defined border.

3. A management system for a buffer memory as defined in claim 1, wherein said means for defining a border includes means for storing the buffer address of a buffer in the unused buffer memory portion that is adjacent to said defined border.

4. A management system for a buffer memory as defined in claim 1, wherein said used buffer memory portion includes first and second buffers having first and second buffer addresses respectively which are opposite extremes in buffer address in the used buffer memory portion, both of said first and second buffers being immediately adjacent to said unused buffer memory portion and said means for defining a border includes means for storing one of said first and second buffer addresses and for storing the address of the buffer in the unused buffer portion that is immediately adjacent to the other one of said first and second buffer addresses.

5. A management system for a buffer memory as defined in claim 1 wherein said list of unused buffers is a list of buffer addresses in said used buffer memory portion.

6. A management system for a buffer memory as defined in claim 1 wherein said means for selecting a next buffer for use from said list of unused buffers selects the last buffer to be added to said list.

7. A management system for a buffer memory as defined in claim 1 wherein said means for defining includes means for storing a buffer address and said means for selecting increases said used buffer memory portion by modifying said stored buffer address by one.

8. A management system for a buffer memory as defined in claim 1 wherein said means for defining includes means for storing a buffer address and said means for checking increases said unused buffer memory portion by modifying said stored buffer address by one.

9. A management system for a buffer memory as defined in claim 1 and further comprising means for checking whenever an unused buffer is removed from said list of unused buffers whether a next buffer to be removed from the list is immediately adjacent to said border between said used and unused buffer memory portions, and if so increasing said unused buffer memory portion by one so as to include said next buffer in said unused buffer portion and removing said next buffer from said list of unused buffers.

10. A management system for a buffer memory as defined in claim 1 wherein said buffers all have a unique buffer address and said buffer addresses form a sequential series of addresses which are considered to be circular in that a highest buffer address is considered next adjacent to a lowest buffer address.

11. A method for managing a buffer memory containing a multiplicity of buffers all of identical size and each having a unique buffer address, comprising the steps of:

defining a border between an unused buffer memory portion of said buffer memory which contains only buffers that are contiguous in address and unused and a used buffer memory portion of said buffer memory which contains at least one buffer that is used and possibly contains also one or more buffers that are unused;

storing a list of currently unused buffers in said used buffer memory portion;

selecting a next buffer for use from the stored list of unused buffers, and if there is no unused buffer in the list, selecting as the next buffer for use a buffer from the unused buffer memory portion that is immediately adjacent in address to the used buffer memory portion and increasing the used buffer memory portion by one so as to include the next buffer for use in the used buffer memory portion;

returning a used buffer to unused status by adding the returning buffer to the list of unused buffers; and checking each time a returning buffer is added to the list of unused buffers, whether the added buffer is immediately adjacent to the border between the used and unused buffer memory portions, and if so increasing the unused buffer memory portion by one so as to include the returning buffer in the unused buffer portion and removing the returning buffer from the list of unused buffers.

12. A method for managing a buffer memory as defined in claim 11 and further comprising the step of:

checking whenever an unused buffer is removed from the list of unused buffers whether a next buffer to be removed from the list is immediately adjacent to the border between the used and unused buffer memory portions, and if so increasing the unused buffer memory portion by one so as to include the next buffer in the unused buffer portion and removing the next buffer from the list of unused buffers.

* * * * *